Feb. 14, 1967　　　　　　　J. D. LAYTON　　　　　　　3,304,101
COUPLING MECHANISM FOR TRAILERS
Filed May 11, 1965　　　　　　　　　　　　　　　2 Sheets-Sheet 1

Jack D. Layton
INVENTOR
BY Kolisch & Hartwell
Attys.

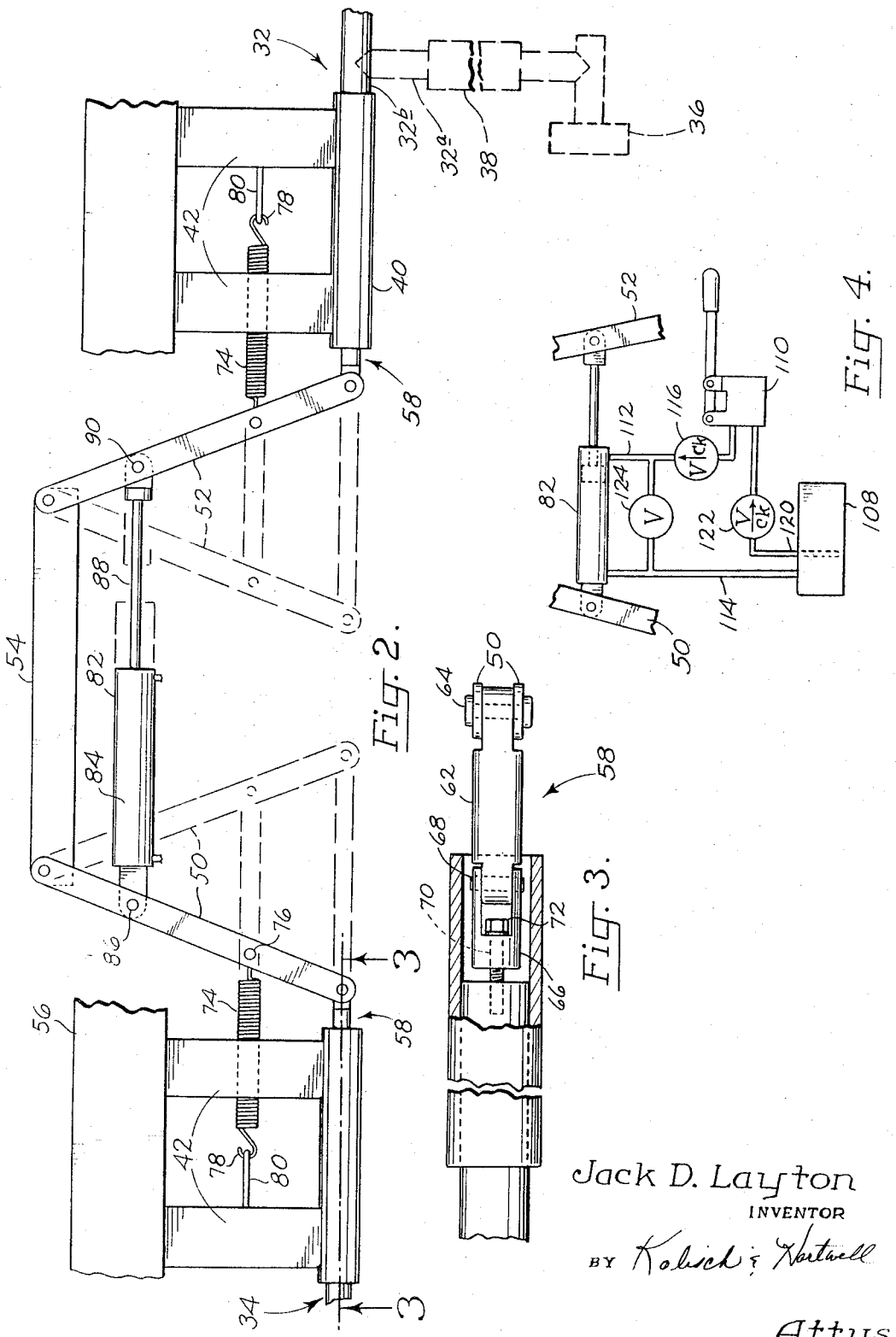

United States Patent Office 3,304,101
Patented Feb. 14, 1967

3,304,101
COUPLING MECHANISM FOR TRAILERS
Jack D. Layton, 4725 Turner Road,
Salem, Oreg. 97302
Filed May 11, 1965, Ser. No. 454,906
13 Claims. (Cl. 280—460)

This invention relates to mechanism for connecting two vehicles, whereby movements of one are controlled by movements of the other. In the usual instance, it is contemplated that the mechanism be employed for coupling together a drawing vehicle with a unit drawn therebehind, although the mechanism has applications in connecting a trailing vehicle which is self-propelled to a vehicle in front which is pushed by the trailing vehicle.

The invention is described hereinbelow in connection with the attachment of a paver or spreader with a vehicle such as a dump truck which tows the spreader while aggregate contained in the dump body of the truck is discharged into a hopper or box forming part of the spreader. In a paving operation, the paver must frequently be disconnected from a given truck, and subsequently coupled to another, when the supply of aggregate in the first truck becomes exhausted, and because of the necessity for repeated changes of the truck, it is desirable that the means coupling the units together be easily and quickly positionable both to produce and to break a connection between the units.

Coupling apparatus has been proposed comprising a pair of connecting or draft arms that extend forwardly from the paver with means mounted adjacent the forward ends of the arms operable to engage the rear wheel assemblies of a truck by fitting against the insides of the rims in these assemblies. With this type of structure, and to produce a connection between paver and truck, ordinarily several steps are taken. Further explaining, initially the draft arms are shifted laterally outwardly on the paver, to permit a truck to be backed between the arms. The arms then are drawn together, and the means described adjacent the forward extremities of the arms fitted inside the rims of the wheel assemblies. Suitable mechanism is then adjusted whereby the arms are locked together so as to prevent relative lateral movement between the arms. To uncouple the truck, the arms are shifted laterally outwardly on the paver to move free of the wheel assemblies, and the truck is then driven forwardly.

Generally, an object of this invention is to provide means for coupling two vehicles or other units together, including connecting arms of the type generally described, and novel means interconnecting these arms facilitating their being shifted on the vehicle mounting the arms.

Another object of the invention is to provide mechanism for coupling two vehicles together, having opposed connecting arms for engagement with the wheel assemblies of a drawing vehicle, featuring a novel construction whereby the two arms, when locked together, are afforded a limited amount of lateral movement as a unit, thus to accommodate some relative lateral movement of the vehicles coupled by the arms.

Another object is to provide coupling mechanism including connecting arms which are laterally shiftable of each other, which has novel means whereby when the arms are moved away from each other, they tend to assume a predetermined position relative to the vehicle on which the arms are mounted, this feature faciliating the backing up of a lead vehicle such as a dump truck between the arms prior to coupling of the vehicles together.

Yet another object is to provide mechanism for coupling two vehicles, including laterally spaced connecting arms, which further includes mechanism operable to lift the arms and maintain them off the ground when the arms are shifted apart. This also facilitates the making of a connection with a lead vehicle, as the arms need not be lifted when subsequently moved together in order to have them in proper position for engagement with the rims of the rear wheel assemblies of the lead vehicle.

A more specific object is to provide coupling mechanism including opposed connecting arms, where springs shift the arms apart and into a predetermined position relative to the vehicle mounting the arms during the act of uncoupling the vehicle from a lead vehicle, and remotely controlled means is provided for drawing the arms together against the bias of such springs.

Yet another object is to provide such a coupling mechanism, wherein a fluid motor is provided for producing relative lateral movement in the connecting arms, such motor forming a part of a floating connection between the arms with the arms locked together, and being shiftable bodily from one side to the other of the vehicle mounting the arms with similar movement of the arms. Preferably, an extensible device such as a ram is provided as the fluid motor, which ram may be hydraulically locked to have a fixed length which determines the lateral spacing of the connecting arms. The ram remains hydraulically locked after a connection is established between two vehicles, which means that at this time there is no relative movement in parts of the ram, which result in minimum wear in these parts.

Yet a further object is to provide coupling mechanism which includes a pair of spaced connecting arms, and a pair of actuating arms for producing movement in these connecting arms, the actuating arms being connected to the connecting arms in such a manner as to permit up and down swinging of forward portions of the connecting arms, without accompanying movement in the actuating arms.

Other novel features and objects of the invention will become more fully apparent from the following description which is to be read in conjunction with the accompanying drawings, wherein:

FIG. 2 is a plan view, drawn on a slightly larger scale, of portions of the coupling mechanism provided in the paver shown in FIG. 1, the dashed outline in the figure indicating different positions for certain parts;

FIG. 3 is a view on an even larger scale, taken along the line 3—3 in FIG. 2, showing means connecting an actuating arm and a connecting arm in the coupling mechanism; and FIG. 4 is a schematic drawing illustrating a hydraulic system such as might be provided for actuating a ram provided in the coupling mechanism.

Figure 1:
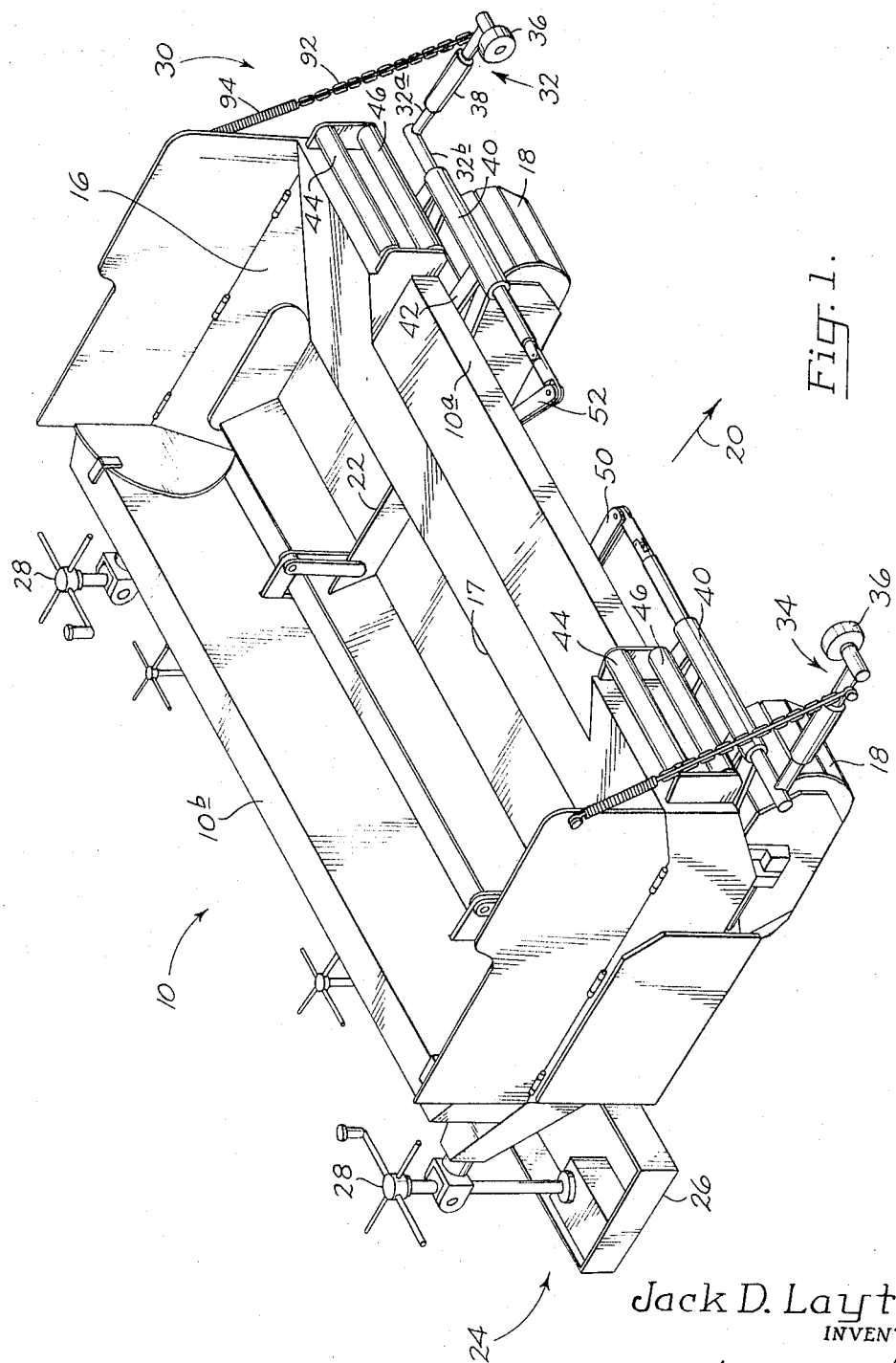
FIG. 1 is a perspective view of a paver or spreader, such being exemplary of the type of unit with which the invention may be employed, and showing coupling mechanism at the forward end of the unit for connecting the unit to the rear of a lead vehicle such as a dump truck.

Turning now the drawings, and first of all more particularly to FIG. 1, here a paver or spreader of the type adapted to be towed over the ground behind a lead vehicle such as a dump truck is indicated generally at 10. The paver includes a hopper or box 16 for holding paving aggregate dumped thereinto from the dump truck, such box including an opening 17 extending along the base of the box through which aggregate flows on leaving the box and immediately prior to being spread over the ground. Partially supporting the paver for travel over the ground are a pair of track assemblies 18, one adjacent each side of the paver. When used to spread aggregate, the paver is towed generally in the direction of the arrow shown at 20.

As is typical with pavers of the type so far generally described, the unit has a considerably greater dimension in a direction extending from one track assembly toward the other (or longitudinally of box 16) than in a direction paralleling arrow 20 (or across the box). In view of the fact, however, that the paver, when operated, is moved with that portion of the paver which faces the lower right-hand side of FIG. 1 moving forwardly, this portion of the paver, indicated at 10a, is referred to as the forward end of the paver, while that portion of the paver indicated at 10b which faces the upper left-hand side of FIG. 1, is referred to as the rear end of the paver.

Considering further details of the paver, the flow of aggregate through opening 17 is controlled by gate mechanism 22 which may be adjusted to vary the size of opening 17. Material on leaving the hopper travels under a screed assembly 24 disposed adjacent the rear of the paver and including a screed plate 26 supporting the rear of the paver that slides over the aggregate to smooth and compact it. Adjusting mechanism 28 connected to the screed assembly affords a means for changing the position of the screed assembly relative to the box, which adjustment produces a change in the thickness of the material spread by the machine. For a further description of pavers or spreaders of the general type so far described, reference is made to an application entitled "Multiple Use Paver," having Serial No. 387,302, filed August 4, 1964.

The coupling mechanism contemplated by the invention for attaching the paver to a lead vehicle is indicated generally at 30. The coupling mechanism is of the type which attaches to the rear wheel assemblies of the lead vehicle, to produce a connection with this vehicle. In a paver, and when the same is coupled to a dump truck through the rear wheel assemblies of the truck, the box described is positioned under the dump body of the truck in position to receive aggregate cascading from this body. The connection therefore, allows the paver and the dump truck to move over a surface with the truck drawing the paver while at the same time dumping aggregate into its box, and with the screed assembly of the paver functioning to smooth and compact the aggregate which flows from the box.

Considering now in more detail the construction of the coupling mechanism, and now referring also to FIGS. 2 and 3, the mechanism comprises opposed connecting arms 32, 34 projecting forwardly and positioned adjacent either side of the paver. The connecting arms are similar in construction, and only one of them will be described in detail.

Considering for purposes of explanation arm 32, the arm comprises a forwardly extending portion 32a which has journaled adjacent the forward end thereof a roller 36. Intermediate the ends of portion 32a and also journaled on the arm is an elongated roller 38. Joined to the rear extremity of portion 32a and extending at right angles to this portion, is a journal portion 32b which is slidably and rotatably received within a sleeve 40 secured on the paver through bracket structure 42 joined to the paver frame. Thus the arm may be shifted laterally, and have its forward end swung up and down with the arm pivoting about a horizontal axis extending transversely of the paver.

When arm 32 is in operative position making a connection with a lead vehicle by engaging a rear wheel assembly of a vehicle, roller 38 rides against the outer sidewall of a tire in the assembly. Roller 36 fits within a rim in the wheel assembly and rides on the inner surface of this rim. In this way, the arm limits the amount of separation possible between the lead vehicle and the paver.

It will be noted in FIG. 1 that the paver adjacent each side includes a pair of rollers shown at 44, 46 journaled on a bracket 48 disposed adjacent and somewhat above a sleeve 40. These rollers, through contact with the tread or treads of a tire or tires in a rear wheel assembly, limit movement of the lead vehicle rearwardly relative to the paver.

The connecting arms are moved in a lateral direction by actuating arms 50, 52. These arms are pivoted adjacent their rear ends to a bar 54 joined to a beam 56 which is part of the paver frame structure. The pivot connections accommodate swinging of the actuating arms about substantially upright axes, with their forward ends moving in arcs extending laterally of the paver. The forward ends of the two actuating arms are coupled to the journal portions of the connecting arms 32, 34 through connectors or means 58.

As best seen in FIG. 3, each connector comprises a short rod 62, pivoted at one end and at 64 to the forward end of an actuating arm, and a clevis 66 pivoted at 68 to the opposite end of rod 62. The clevis is journaled at 70 on the shank of a fastener 72 secured to the extreme end of the journal portion of a connecting arm. The connector, by reason of the swivel connection afforded by clevis 66 and fastener 72, accommodates rotation of a journal portion 32b within its encompassing sleeve (an up and down swinging movement of the forward end of a connecting arm) without corresponding movement occurring in rod 62. The rod 62, in turn, by reason of pivot connections 64 and 68 between it and the actuating arm and the clevis, respectively, accommodates arcuate movement in the end of an actuating arm when producing lineal sliding movement of a journal portion along the axis of the sleeve which surrounds the journal portion.

Each actuating arm has its forward end, or the end pivoted to a rod 62, biased laterally outwardly by a coil spring 74. Spring 74 has one end secured to an intermediate portion of the actuating arm, at 76, and its opposite end mounted, at 78, on a piece 80 joined to part of bracket structure 42. Each coil spring urges lateral outward movement of an actuating arm to a limit position determined by the forward end of the arm striking the inner end of a sleeve 40.

An extensible fluid motor, more specifically, a single-acting fluid ram 82 interconnects the actuating arms at locations disposed rearwardly of biasing springs 74. More specifically, ram 82 has its cylinder 84 journaled at 86 to arm 50, and its rod end 88 journaled at 90 to arm 52. Within the cylinder is the usual piston which is connected to rod 88. As will be described, means is provided for admitting fluid under pressure to the right end of cylinder 84 in FIG. 2, to cause contraction of the ram, which contraction is effective to swing the forward ends of the two actuating arms toward each other. Means is also provided for locking hydraulically the piston within the cylinder, with the ram then having a fixed length.

With the ram so locked and having a fixed length, the ram and the actuating arms are effective to maintain the two connecting arms at a substantially fixed distance apart. With the two arms having a relative lateral spacing whereby the forwardly extending portions of the arms are spaced from each other a distance somewhat greater than the distance between the outer ends of sleeves 40, and a distance less than the maximum spacing permitted between the two connecting arms, which is the usual operative position for the arms when the paver is connected to a dump truck, some side-to-side movement of the paver is afforded relative to the dump truck, with the connecting arms and actuating arms moving in unison. During such movement of the arms, the ram connecting the actuating arms moves bodily, i.e., floats from side to side, while performing its function of fixing the relative spacing of the arms. In this way, some side-to-side movement of the arms is afforded, which is desirable, and this is without any internal movement in the ram, which would be disadvantageous, as it would result in excessive wear in seals and other parts in the ram.

It will be noted, and referring to FIG. 1, that extending between a forward portion of a connecting arm and the paver proper is a chain 92 and a coil spring 94. The chain and spring are flexible and accommodate in and out movement of a connecting arm. With lateral outward movement of a conecting arm, tension increases in the chain and spring (these together constituting a tension-transmitting means), with the result that the forward end of the connecting arm tends to be lifted slightly and maintained off the ground. This tension is relaxed somewhat with a connecting arm moved laterally inwardly, but not to such an extent as to enable the forward end of a connecting arm to drop to the ground or below a level where it is prevented from moving easily inside the rim of a rear wheel assembly.

Referring now to FIG. 4 where a hydraulic system is illustrated such as may be employed to produce contraction of the ram 82, a reservoir is shown at 108 for holding fluid, and at 110 a hand pump is indicated which may be actuated to pump fluid through a conduit 112 to the right end of the ram, conduit 112 including a check valve 116. Fluid from the opposite end of the ram travels through a conduit 114 to reservoir 108, and thence through a conduit 120 provided with a check valve 122 to pump 110. Interconnecting conduits 112, 114 is a two-way valve 124.

With the connecting arms spaced laterally apart and to bring them together, the hand pump is actuated which forces fluid through conduit 112 to the right end of the ram, with fluid from the opposite end returning to the reservoir through conduit 114. With proper spacing produced between the connecting arms, the arms are prevented from spreading apart from each other by check valve 116, which prevents reverse flow in conduit 112, thus to lock hydraulically the ram parts. At such time as it is desired to have the arms move part, valve 124 may be opened (it previously being closed) to provide a path for fluid flow between the ends of the ram. Springs 74, with the valve open, urge the actuating arms apart, causing extension of the ram and flow through valve 124.

Explaining now generally the operation of the paver and the coupling means described, initially the arms are spaced apart their maximum distance by coil springs 74, valve 124 being left open to permit fluid flow between the ends of the ram. The spring and chain assemblies extending between the paver and the forward ends of the connecting arms function to keep these forward ends raised with the arms spread apart. The arms further have a predetermined position relative to the paver, which is substantially at equal distances to either side of the longitudinal axis of the paver. With such positioning of the connecting arms, the driver of a dump truck can readily tell if his truck is in proper aligned position with the paver while backing the truck between the connecting arms.

With the truck backed between the arms and substantially aligned with the longitudinal axis of the paver, valve 124 is closed and the pump actuated to cause contraction of ram 82. This swings actuating arms 50, 52 toward each other, and functions to bring the connecting arms laterally inwardly. With the chain and spring assemblies 92, 94 maintaining the forward ends of the connecting arms raised, rollers 36 on the forward ends of these arms are high enough to move inside the rims of the rear wheel assemblies in the truck. With both rollers suitably positioned inside these rims, actuation of the pump is stopped, with check valve 116 then hydraulically locking the ram. The ram at this time constitutes a rigid link of predetermined length maintaining a predetermined spacing between the connecting arms. With the dump truck then moved forwardly, its rear wheel assemblies, by engagement with rollers 36, function to pull the paver forwardly. Relative up-and-down movement between the paver and dump truck is accommodated by up-and-down swinging of the forward ends of the connecting arms. Relative lateral shifting of the paver with respect to the truck is accommodated as described by shifting of the connecting arms laterally in sleeves 40.

When it is desired to uncouple the dump truck, the operator opens valve 124 with the coil springs 74 then swinging the actuating arms apart. Simultaneously with lateral spreading apart of the connecting arms, they may raise slightly because of increased tension produced in chain and spring assemblies 92, 94. On rollers 36 clearing the rear wheel assemblies, the dump truck is free to move forwardly and out from between the connecting arms.

It is contemplated that the pump and shut-off valve described be located to the rear of the paver in easy reach of an operator stationed on the screed assembly. It will be seen that with the construction, this operator can readily couple the paver with a dump truck without the necessity of having to leave the screed assembly and walk to the front of the paver. Some degree of relative movement between the paver and the lead vehicle is afforded with the coupling connection made, which is desirable in an organization of the type described. No substantial modifications need be made to the lead vehicle to permit coupling of the paver thereto. Coupling may be performed with vehicles of different sizes and having rear wheel assemblies of different diameters and spaced at different spacings apart. Furthermore, the coupling mechanism is entirely reliable even though simply constructed. With provision of the mounting for the ram whereby it floats when interconnecting the actuating arms, wear in the ram is minimized.

While there has been described an embodiment of the invention, variations are possible and it is intended to cover all such modifications and variations as would be apparent to one skilled in the art, and that come within the scope of the appended claims.

It is claimed and desired to secure by Letters Patent:

1. Means for connecting one vehicle to another disposed in front of it comprising
   a pair of forwardly projecting laterally spaced elongated arms pivoted adjacent their rear ends to said one vehicle for lateral movement of their forward ends,
   a pair of opposed biasing springs, one being connected to each arm, urging the forward ends of the arms apart, and tending to hold the arms in a predetermined position relative to the longitudinal axis of said one vehicle,
   an extensible motor carried between the arms extending transversely across said one vehicle, with ends of the motor operatively connected to the arms at points located forwardly of their pivotal connections with the vehicle, said motor being movable as a unit from side to side of the vehicle with swinging of said arms, and being operable upon contraction to draw the forward ends of said arms together, and
   a pair of connecting devices, one connected to the forward end of each arm for lateral movement with the arm, each of said devices extending laterally outwardly and thence forwardly from the arm to which it is connected, and being mounted for movement transversely of said one vehicle, each of said devices having means adapted to engage said other vehicle.

2. Means for connecting one vehicle to another disposed in front of it comprising
   laterally spaced and laterally shiftable connecting devices mounted on said one vehicle, extending forwardly therefrom, and adapted to connect with said other vehicle along opposite sides thereof, spring-biased means operatively connected to said devices tending yieldably to urge the devices into a predetermined position relative to the longitudinal axis of said one vehicle, and an extensible motor connected to said spring-biased means, operable upon actuation to draw said devices together, against the biasing of said spring-biased means, and into engagement with said other vehicle.

3. Means for connecting one vehicle to another comprising laterally spaced and laterally shiftable connecting devices mounted on said one vehicle extending forwardly from said one vehicle and adapted to connect with said other vehicle along opposite sides thereof, means comprising arms and biasing springs, with said arms pivotally interposed between said one vehicle and said devices, tending to position said devices in a predetermined position relative to the vehicle, and an extensible motor adjustable to various fixed lengths carried between said arms, operable upon actuation to shift said arms thus to draw said draft devices together, said motor, when having a given fixed length, becoming a rigid unit and forming a link between said arms, whereby relative lateral movement between the vehicles and lateral shifting of said devices is accompanied by interdependent pivotal movement of said arms.

4. Means to accommodate towing of one vehicle by another comprising a pair of laterally spaced arms pivoted to and extending forwardly from said one vehicle, a pair of biasing springs, one for each arm, tending to urge the arms apart, laterally spaced and laterally movable connecting devices, one operatively connected to each arm, extending forwardly from said one vehicle, adapted to engage said other vehicle, and an extensible motor adjustable to various fixed lengths carried by and mounted between said arms, actuation of said motor operating by pivoting said arms to draw said devices together into engagement with said other vehicle, said motor upon being adjusted to a given fixed length linking said arms for movement together, whereby said devices become interdependently laterally movable.

5. The combination of a unit to be towed over the ground, a pair of laterally spaced connecting arms extending forwardly from said unit from adjacent the sides thereof, each of said arms being movable in a lateral direction, an extensible motor operatively connected between the arms movable laterally as a unit with lateral movement of the arms and forming a floating link between the arms defining the lateral spacing between the forward ends of the arms, and biasing means operatively connected to the arms urging the forward ends of the arms apart.

6. The combination of claim 5, wherein the unit includes a frame, and the biasing means includes a spring for each arm mounted between the frame and the arm urging the arm to a predetermined position relative to the frame.

7. In draft means to accommodate towing of one vehicle over the ground by another, a draft arm extending longitudinally of said one vehicle, including a journal portion extending transversely of said one vehicle adjacent the rear end of the draft arm, a sleeve mounted on and extending transversely of said one vehicle receiving the journal portion of the draft arm with the journal portion rotatable in the sleeve to permit up and down swinging of the forward end of the draft arm, and shiftable axially of the sleeve to permit lateral shifting of the draft arm, an actuating arm pivoted to said one vehicle for lateral swinging movement of one end thereof, and means interconnecting said journal portion of said draft arm and said end of the actuating arm whereby on swinging movement of said end of said actuating arm said draft arm is shifted laterally, said means including means accommodating rotation of said journal portion in the sleeve relative to said end of said actuating arm.

8. In draft means for connecting trailing and lead vehicles, an elongated longitudinally extending draft arm extending forwardly from the trailing vehicle with means on a forward portion thereof for attaching to the lead vehicle, journal means adjacent the rear end of the draft arm mounted for shifting on the trailing vehicle in a direction extending transversely of the vehicle, thus to produce lateral shifting of the draft arm, and rotatable about an axis extending transversely of the trailing vehicle, whereby the forward portion of the draft arm may swing up and down, and an actuating arm movably mounted on the trailing vehicle for producing lateral shifting of the draft arm by moving said journal means in said transverse direction, said actuating arm being connected to the draft arm by means including a swivel connection accommodating rotation of the journal means about said transverse axis.

9. The draft means of claim 8, wherein said last-mentioned means includes pivoted rod structure providing an operative connection between a portion of the actuating arm and said journal portion, said rod structure permitting said portion of the actuating arm to move in a path extending at an angle relative to the transverse direction in which said journal portion is shiftable.

10. The draft means of claim 8, wherein biasing means is operatively connected to said journal portion urging it in said transverse direction laterally outwardly on the trailing vehicle, and a fluid-operated motor is operatively connected to the actuating arm operable when actuated to move the arm to produce laterally inward shifting of said journal portion.

11. In draft means for connecting trailing and lead vehicles, an elongated longitudinally extending draft arm extending forwardly from the trailing vehicle with means on a forward portion for attaching to the lead vehicle, journal means adjacent the rear end of the draft arm, mounted for shifting on the trailing vehicle in a direction extending transversely of the vehicle, thus to produce lateral shifting of the draft arm, and rotatable about an axis extending transversely of the trailing vehicle, whereby the forward portion of the draft arm may swing up and down, means connected to the draft arm, on a portion of the arm spaced forwardly of said journal portion, and also connected to the trailing vehicle at a point spaced above the elevation of said journal portion, tensioned on laterally outward shifting of the draft arm, and when tensioned operable to raise the forward portion of the draft arm on further laterally outward shifting of the arm, and means operatively connected to the draft arm for producing laterally outward shifting of the draft arm.

12. In means for connecting two mobile units adapted for travel over the ground with one behind the other unit, a connecting arm extending forwardly from said one unit with means adjacent its forward end for engagement with said other unit, said connecting arm being mounted adjacent its rear end on said one unit for movement laterally thereof, and up and down movement of the forward end of the arm, tension-transmitting means connected between said arm and one unit tensioned on lateral outward movement of the arm on said one unit and operable when tensioned to hold the forward end of the arm elevated from the ground, and means for shifting the arm laterally inwardly to relax the tension in said tension-transmitting means.

13. The apparatus of claim 12, wherein said tension-transmitting means is yieldably extensible.

References Cited by the Examiner
UNITED STATES PATENTS

| | | | |
|---|---|---|---|
| 2,717,783 | 9/1955 | Flink | 280—460 X |
| 3,138,392 | 6/1964 | Holland | 280—460 X |
| 3,237,539 | 3/1966 | Layton | 94—44 |

LEO FRIAGLIA, *Primary Examiner.*